United States Patent [19]
Korenshtein

[11] Patent Number: 5,564,016
[45] Date of Patent: Oct. 8, 1996

[54] METHOD FOR CONTROLLING ACCESS TO A COMPUTER RESOURCE BASED ON A TIMING POLICY

[75] Inventor: Roni Korenshtein, Los Gatos, Calif.

[73] Assignee: International Business Machines Corporation, Armonk, N.Y.

[21] Appl. No.: 536,603

[22] Filed: Sep. 29, 1995

Related U.S. Application Data

[63] Continuation of Ser. No. 168,960, Dec. 17, 1993, abandoned.

[51] Int. Cl.⁶ .................................................. G06F 11/00
[52] U.S. Cl. ............................................................ 395/186
[58] Field of Search ........................... 395/186, 187.01, 395/188.01, 490, 479; 380/23

[56] References Cited

U.S. PATENT DOCUMENTS

| | | |
|---|---|---|
| 4,348,696 | 9/1982 | Beier ........................... 358/188 |
| 4,941,175 | 7/1990 | Enescu et al. . |
| 5,023,907 | 6/1991 | Johnson et al. . |
| 5,048,085 | 9/1991 | Abraham et al. . |
| 5,091,939 | 2/1992 | Cole et al. . |
| 5,148,481 | 9/1992 | Abraham et al. . |
| 5,187,352 | 2/1993 | Blair et al. . |
| 5,226,080 | 7/1993 | Cole et al. . |
| 5,233,658 | 8/1993 | Bianco et al. . |
| 5,367,704 | 11/1994 | Hasuo et al. ............. 395/800 |

OTHER PUBLICATIONS

Harn et al "Integration of user authentication and access control" IEEE Procedinas vol. 139, No. 2, Mar. 1992.
White, Fisch and Pooch "Computer System and Network Security", CRC Pess 1995 pp. 37–51, 75–89 and 155–187.
Miller et al., "Access Control By Boolean Expression Evaluatin", 1990 IEEE pp. 131–139.
M. Burrows, M. Abadi and R. Needham, "A Logic of Authentication," ACM Transactions on Computer Systems, vol. 8, No. 1, pp. 18–36 (Feb. 1990).

*Primary Examiner*—Robert W. Beausoliel, Jr.
*Assistant Examiner*—Joseph E. Palys
*Attorney, Agent, or Firm*—Donald J. Pagel

[57] ABSTRACT

A method for controlling access to a resource running on a host computer by one or more users which uses a timing policy to control when a current authorized user can be replaced by a new authorized user. The method comprises the steps of scanning a first list to verify that the new user is on the first list, scanning a second list to determine if a current user can be replaced without violating the timing policy, and granting the new user access to the resource if the timing policy is not violated. The method can be used to control access to an application program running on a file server in a local area network.

3 Claims, 4 Drawing Sheets

METHOD FOR CONTROLLING ACCESS TO A COMPUTER RESOURCE BASED ON A TIMING POLICY

This is a continuation of application Ser. No. 08/168,960 filed Dec. 17, 1993, now abandoned.

TECHNICAL FIELD

The present invention relates to a security method for protecting a computer resource, such as a software program running on a host computer, from access by unauthorized users. More particularly, the present invention relates to a method that checks an authorized list of users to verify that a new user is either on the authorized list or is not barred by a timing policy from being added to the authorized list.

BACKGROUND ART

Software based techniques for limiting the number of users who may access a program running on a host computer are well-known in the art. For example Burrows et al. in "A Logic of Authentication," ACM Transactions on Computer Systems, Vol. 8, No. 1, Pages 18–36 (February 1990), review the theoretical bases of many of the protocols that have been developed for providing security in distributed systems.

In a more practical example, Enescu et al., in U.S. Pat. No. 4,941,175, issued Jul. 10, 1990, disclose a method for controlling the number of users given access to software running on a host-based system by use of an encrypted authorization list and an access control program.

A problem with this method is that the user can bypass the authorization checks by simply updating one of the records in the access control list to contain the user identification of a newly requesting user. The method provides no protection against changing the contents of the access control list, nor does it specify that the list cannot be changed.

Other types of access control programs that utilize hardware devices, like magnetic cards, with time data coded on the magnetic card are also known. For example, Abraham et al., in U.S. Pat. No. 5,048,085, issued Sep. 10, 1991, disclose a security system for network access that utilizes a card having an embedded integrated circuit.

In another approach to network security, Johnson et al., in U.S. Pat. No. 5,023,907, issued Jun. 11, 1991, disclose a network license server that limits the number of users that can use the network at a given time.

None of these techniques provide a software based method for limiting the number of users of a network resource to a group persons listed in a file, while allowing the file to be updated according to conditions specified by a software based timing policy.

SUMMARY OF THE PRESENT INVENTION

Briefly, the preferred embodiment of the present invention comprises a method for controlling access to a resource running on a host computer by one or more users. For example, the method can be used to control access to an application program or a data file running on a local area network. The method uses a timing policy to control when a current authorized user can be replaced by a new authorized user and therefore allows specific users in a list of N authorized users to be replaced periodically in accordance with the timing policy.

The method comprises the steps of scanning a first list to verify that the new user is on the first list, scanning a second list to determine if a current user can be replaced by the new user without violating the timing policy, and allowing the new user access to the resource if the timing policy is not violated.

DETAILED DESCRIPTION OF THE PREFERRED EMBODIMENT

Figure 1:
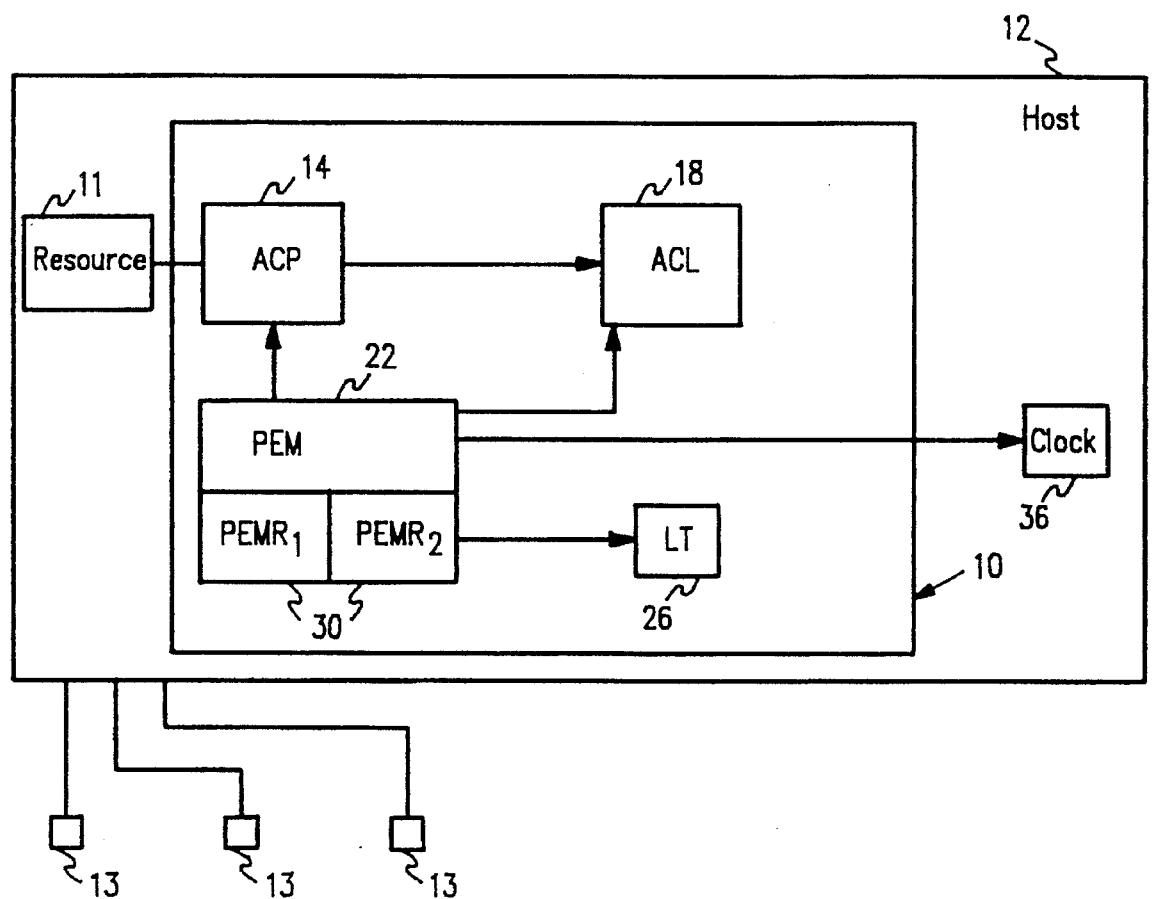
FIG. 1 is a block diagram illustrating the modular components of a timing policy controlled authorization program and the associated hardware according to the present invention.

FIG. 1 illustrates the modular components of a timing policy controlled authorization program 10. A computer resource 11 runs on a host computer 12. A plurality of access sites 13 provide access to the resource 11 through the host computer 12.

The program 10 is associated with the resource 11 and comprises an access control program 14, an access control list 18, a policy enforcement module 22 and a log table 26. A plurality of policy enforcement module routines 30 are associated with the policy enforcement module 22. A clock 36 inputs timing data to the policy enforcement module 22.

As is described in U.S. Pat. No. 4,941,175, the access control list (ACL) 18 comprises a file containing a header record followed by a plurality of user records, with one user record being assigned to each authorized user of a computer resource. The header record includes information characterizing the number of authorized users of the resource, and is typically an integer which may be encrypted. The number of authorized users "N" is referred to as the depth of the ACL 18.

The host computer 12 may be any type of data processing system that utilizes one or more central processing units (CPU), including mainframe computers and microprocessor controlled minicomputers, file servers and personal computers. The host computer 12 includes a communications server for managing physical data transmission between the host computer and the access sites 13, and a means for storing the resource 11 and the authorization program 10, such as random access memory, read only memory or a magnetic or optical storage medium.

The access sites 13 may be any type of device for accessing the resource 11 through the host computer 12, including workstations, dumb terminals, other mainframe or personal computers, wireless devices or other application files.

The computer resource 11 may be any item that runs under the control of the host computer 12, such as an application program or an operating system, or the resource 11 may be all of the data on an entire hard magnetic disk or a CD-ROM disk, etc. For discussion purposes, it will be assumed that the resource 11 is an application program running on a file server in a local area network (LAN). However, the invention is not limited to this example.

The access control program (ACP) 14 is called when a user attempts to access the computer resource such as by logging onto the LAN. As is explained in U.S. Pat. No. 4,941,175, when the ACP 14 is called, it checks the ACL 18 to verify that the user is authorized to access the resource. In the present invention, in addition to the ACP 14, the policy enforcement module (PEM) 22 is included in the program 10. The PEM 22 functions to ensure that a timing policy hasn't been violated and contains the programming code required to implement the timing policy.

The timing policy is a concept or policy decided on by a party (provider) who controls access to the computer resource, such as the owner or developer of an application program. The timing policy specifies timing constraints as to when or how often entries in the ACL 18 may change. For example, the timing policy may include one or more time periods or parameters "T" that are related to the timing constraints.

The timing policy may be a standard policy across all products offered by the provider, in which case the PEM 22 is standard across all products, or there may be different timing policies for different situations or products. In this latter case, a unique code referred to as a Timing Policy Code (TPC), may, for example, be part of the encrypted information stored in the header record of the ACL 18. The TPC is symbol or code representing a particular timing policy, i.e. each timing policy will have a unique code representing it and a unique PEMR 30 for implementing it.

As a first example of a timing policy, the timing policy may be that no more than N users are allowed to use the protected resource in any time period "T". An attempt to authorize the K-th user, where K=N+1, in the given time period T, will be considered a policy violation.

As a second example, another timing policy may be that once an authorized user has exercised his authorization, i.e. requested and achieved access to the protected resource, that user may not be replaced with another for at least 30 days.

As a third example, the timing policy may be that the ACL 18 list component for each authorized user must include the user id and the date after which this user is authorized to use the protected resource. An additional condition may be imposed that the user may not be replaced with another user from this start date for the next 10 days. It will be considered a policy violation if an ACL list record contained the pair (USER-I 1-1-89) and this record is changed to (USER-J 1-5-89) on Jan. 5, 1989, and the user, whose userid is USER-J, has actually attempted to obtain authorization.

The time period T associated with a particular timing policy may specify, for example, how often a specific entry in the list component of the ACL 18 may change. T may be, for example, a day, a week, a month or an hour. Additionally, T may either be a constant across all products, or it may be a variable, changing for different products. In the latter case, T, or any other timing parameter, could be encrypted into the ACL file, along with the maximum N.

When the timing policy is violated, access to the resource 11 is restricted in some way, such as by denying access to the user attempting to violate the timing policy. Access to the resource 11 can also be denied to other users, such as to a user listed in the log table whose user identification is involved in an attempted timing policy violation. The denial of access to the resource 11 is also referred to as "revoking authorization."

The log table (LT) 26 contains a log of the usage history of the protected resource and any other information required to ensure that the timing policy is not violated. For example, the LT 26 may contain up to N encrypted records, where N is the depth of the ACL 18. Each one of the N records contains a user id "u" and some timing information "t" from which the PEM 22 can determine how long a specific user has been using the resource. The timing information "t" can also be used to determine, based on the timing policy, whether this user's authorization may be revoked, for authorizing another requesting user.

As used herein, the timing information "t" can include any period of time such as seconds, hours, days or months, or a representation of a calendar date. The clock 36 provides the timing information "t" (which may be time and/or date information) to the PEM 22 which then updates an entry in the LT 26 to reflect the user's current usage of the resource.

Figure 2:
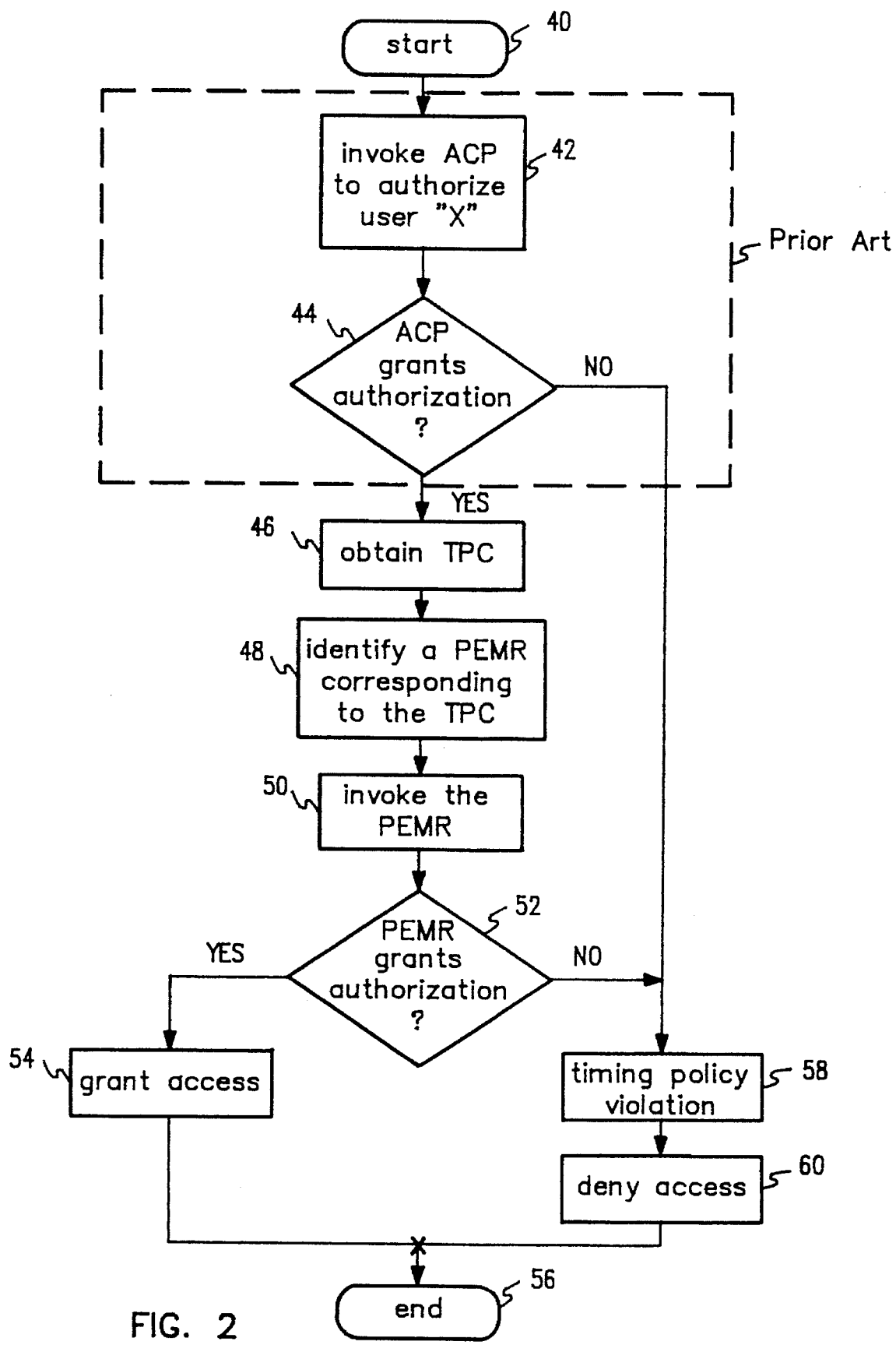
FIG. 2 is a flowchart illustrating the logic of a policy enforcement module (PEM) of the present invention.

Referring to FIG. 1 and FIG. 2, to summarize the information given above, the present invention functions as follows: When a user, whose user id is X, requests access to the protected resource 11, the PEM 22 is called from a memory location in the host 12, shown at start terminal 40 in FIG. 2, and invokes the ACP 14 at process box 42. The ACP 14 performs the old validation at decision box 44, as described in U.S. Pat. No. 4,941,175, to ensure that the depth N is valid, and that X is within the depth of the list. If this validation yields a positive result, then the PEM 22 obtains a timing policy code (TPC) at process box 46, from the encrypted header record of the ACL 18 for example. The PEM 22 then identifies a policy enforcement module routine 30 (PEMR), that corresponds to the value of the TPC obtained, at process box 48 the PEMR 30 that corresponds to the obtained TPC is then invoked at process box 50.

The PEM 22 may contain one or more PEMR 30, depending on how many timing policies there are. A PEMR 30 comprises the programming code for implementing a specified timing policy. Hence, if there are two timing policies to apply to two situations, there would be two PEMRs 30; one for each timing policy. At decision box 52, the PEMR determines if the timing policy (TP) has been violated. If the TP has not been violated, User X is granted access to the resource 11 at process box 54 and the PEM 22 ends at end terminal 56. If the TP has been violated, a timing policy violation occurs at process box 58, access is denied to X at process box 60, and the program ends at end terminal 56. The flowchart illustrated in FIG. 2 corresponds to Example 1 below.

Figure 3:
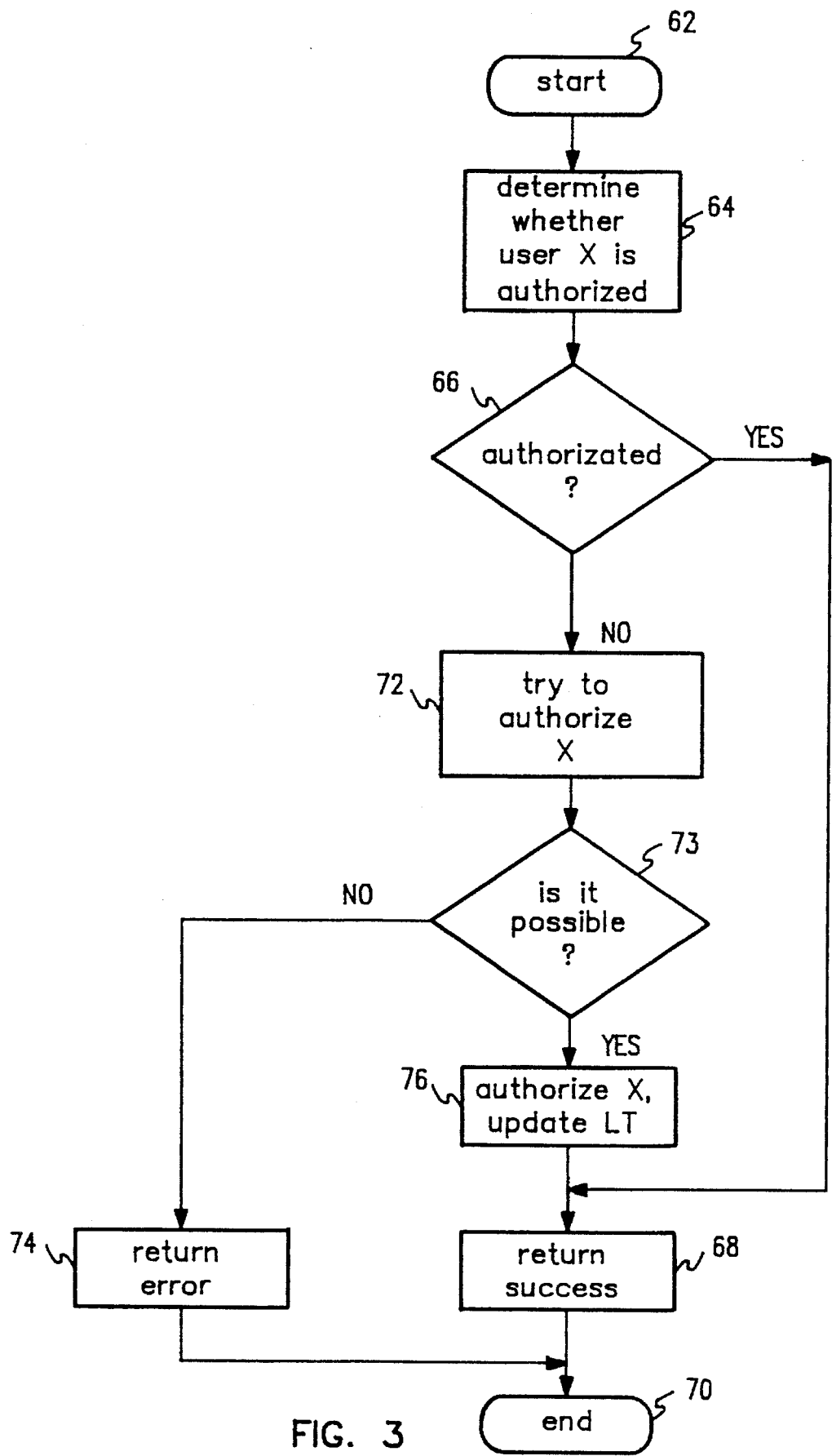
FIG. 3 is a flowchart illustrating the general logic of a policy enforcement module routine (PEMR) of the PEM of the present invention.

Referring now to FIG. 3, the general logic of a PEMR 30 is shown. The PEMR 30 is invoked by the PEM 22 at start terminal 62 as previously discussed. At process box 64, information is provided from the ACL 18, LT 26 and timing policy, to determine if X is an authorized user. At decision box 66 it is determined if X is an authorized user. If X is an authorized user, an authorization message is provided to the PEM 22 at process box 68, and the PEMR terminates at end terminal 70.

If X is not authorized, then at process box 72, it is attempted to authorize X to use the resource 11. Such means for authorizing X to use the resource 11 may include searching for an available entry in the ACL 18 or determining if there is an empty entry in the LT 26, more thoroughly discussed hereafter. At decision box 73 it is determined if it is possible to authorize X. If X cannot be authorized, then the PEMR provides an error message at process box 74, which will result in a timing policy violation. The program then ends at end terminal 70. If X can be authorized, then at process box 76 the LT is updated, and the authorization message is provided at process box 68, and the PEMR terminates at end terminal 70.

Figure 4:
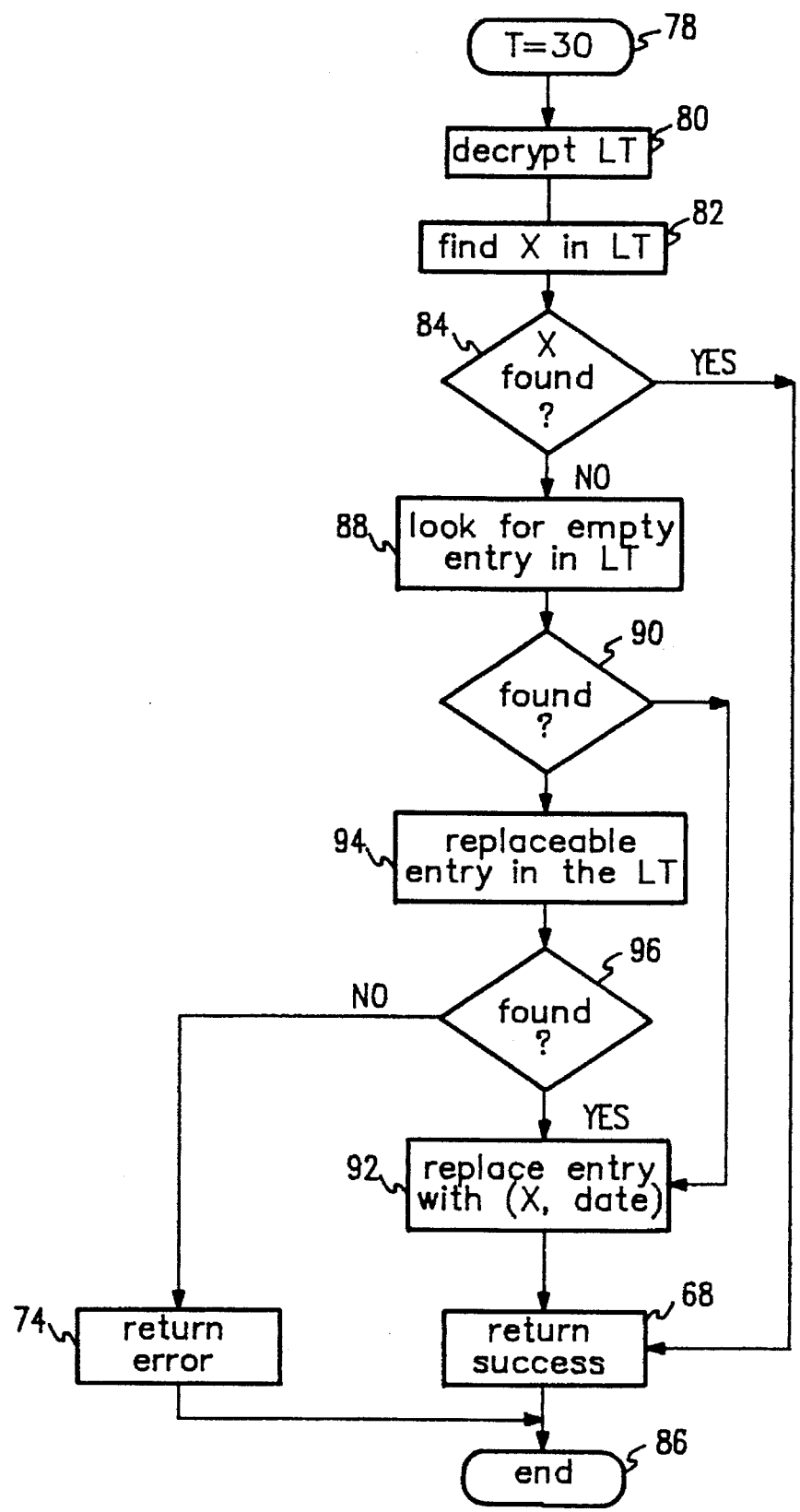
FIG. 4 is a flowchart illustrating the logic of a specific example of a policy enforcement module routine (PEMR) of the present invention.

FIG. 4 is a flowchart illustrating the logic of a specific PEMR 30. In FIG. 4, a terminal 78 shows that a time period T=30 days is specified by the timing policy. At process box 80, the LT 26 is decrypted. The LT 26 is then searched at process box 82, to find X in the LT 26. At decision box 84, it is determined if X is found in the LT 26. If X is found in the LT 26, then an authorization message is provided to the PEM 22 at process box 68, and the PEMR terminates at end terminal 86.

If X is not in the LT 26, then the LT 26 is searched for an available entry that X can be placed in, shown at process box 88. If an open entry in the LT 26 is found at decision box 90, then X is placed in the LT 26 and the LT 26 is updated with information such as the identification (id) of user X, and the current date, as shown at process box 92. The authorization message is provided at process box 68, and the PEMR terminates at end terminal 86. If an open entry in the LT 26 is not found, then the LT 26 is searched for an existing entry that can be replaced, shown at process box 94. It is determined at decision box 96 if there is a replaceable entry in the LT 26. If there is a replaceable entry in the LT, then the LT 26 is updated at process box 92, the authorization message is provided at process box 68, and the program terminates at end terminal 86. If there is not an entry in the LT 26 that can be replaced, then X cannot be authorized and the PEMR provides the error message, at process box 74, which results in a timing policy violation. X is not granted access to the resource 11 and the program ends at end terminal 86. The flowchart illustrated in FIG. 4 is discussed further in Example 2 below.

In the preferred embodiment, the authorization program 10 is embedded among the object code modules of the protected resource. The parameters, such as N and T, or any other timing parameter, and the policies, such as the timing policies and the PEMR's 30, are set by the resource provider and are distributed with the protected resource.

The following examples illustrate various aspects of the invention but are not limiting in any way:

EXAMPLE 1

In flow chart form, the overall implementation of the PEM 22 can be summarized as follows:

```
invoke the ACP 14
if an error is returned, then notify a policy violation
else
    obtain the TPC (for example, from the ACL header)
    invoke the PEMR 30 which corresponds to this TPC to
    perform the timing policy validation.
```

EXAMPLE 2

The following is an example of a PEMR 30 which may be used to implement the timing policy which was described above in the second example of a timing policy:

Given T=30 days, and an ACL of depth N. Maintain a Log Table (LT) having N entries, initially, all N entries are empty. As entries are filled they will contain encrypted (u,d), where u is a userid, and d corresponds to the date on which the user, whose userid is u has first exercised his/her authorization privilege.

The algorithm below is called after user X has requested authorization and the method of U.S. Pat. No. 4,941,175 has been used to verify that X is in the ACL. The algorithm below will verify that X has been put in the ACL in accordance with the timing policy:

```
Decrypt the LT.
If X has an entry in the LT then
    X is a valid user!
else (X is not in the LT)
if there is an empty entry in LT then X is valid and
needs to be added to the LT as follows:
Encrypt (u,d) where u is the userid X and d is the
current date.
Put the encrypted information into the empty entry.
else (there are no empty entries in the LT. The LT is
full).
Find an entry (Y,D) in LT, such that
    1) Y is not in the ACL and
    2) At least T days have passed since the date D
If such an entry is found
X is valid, and LT needs to be updated as
follows:
replace the entry containing (Y,D) with
(X,TD), where TD is todays date.
else
X is not valid. Some userid has been taken out
of the ACL in less than T days and replaced
with X. This is a violation of the timing
policy.
```

EXAMPLE 3

This is an example of an authorization scenario based on the second timing policy implementation described previously. Given an empty LT, T=30 days, ACL has depth N=2 (max of 2 users) and its list is initially empty. Userid's are X, Y, Z & K. The following events occur in chronological order:

On Jan. 1, 1989 X is put into the ACL.

On Jan. 2, 1989 Y attempts to access. Fails because the old logic detects that Y is not in the ACL.

On Jan. 3, 1989 Y is added to the ACL.

On Jan. 4, 1989 Y attempts to access. The LT is empty so (Y,1-4-89) is encrypted and added to the LT and access is allowed.

On Jan. 5, 1989 Y attempts to access. Since Y has an entry in the LT, it's allowed access.

On Feb. 1, 1989 X attempts to access. There is an empty slot available in the LT so (X,2-1-89) is encrypted and added to the LT. X is allowed access.

On Feb. 2, 1989 Y is replaced with Z in the ACL.

On Feb. 6, 1989 Z attempts to access. Z is not in the LT, but since Y is in the LT, and Y is no longer in the ACL, and more than 30 days (T) have passed since Jan. 4, 1989 (Y's first access date), (Z,2-6-89) is encrypted and replaces the entry in the LT that previously contained the encryption of (Y,1-4-89) and Z is allowed to access.

On Feb. 10, 1989 X is replaced by K in the ACL.

On Feb. 11, 1989 K attempts to access. K is not in the LT. The decrypted entry (X,2-1-89) is found in the LT and X is no longer in the ACL. However, since only 10 days (less than T=30 days) have passed since the first time X has used its authorization privilege for the first time, K is denied access.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for controlling access to a computer resource running on a host computer comprising the steps of:

a) in response to a request from a new user having a new user identification code X to access a computer resource associated with a host computer, calling a log table having N entry slots from a memory location associated with a host computer, with each of the N entry slots being filled with an entry comprised of the form (u,t), where u is a user identification entry for a user u, and t corresponds to a time at which the user u accessed the computer resource;

b) using a clock associated with the host computer to generate a current time CT;

c) calling a policy enforcement module from the memory location associated with the host computer, the policy enforcement module specifying a time condition T between the time t and the current time CT that must be satisfied before access to the computer resource will be granted to the new user not having an entry in the log table;

d) comparing the current time CT to at least one of the N entries in the log table referred to as (y,t1) to determine a time period between the current time CT and a time t1, where y is a user identification entry for a user y, and t1 corresponds to a time at which the user y accessed the computer resource; and e) denying the new user access to the computer resource if the time period does not satisfy the time condition T.

2. The method of claim 1 further comprising the step of:

f) replacing the entry (y,t1) with an entry (X,CT) if the time condition T is satisfied.

3. The method of claim 1 wherein the host computer is a file server in a local area network.

* * * * *